UNITED STATES PATENT OFFICE.

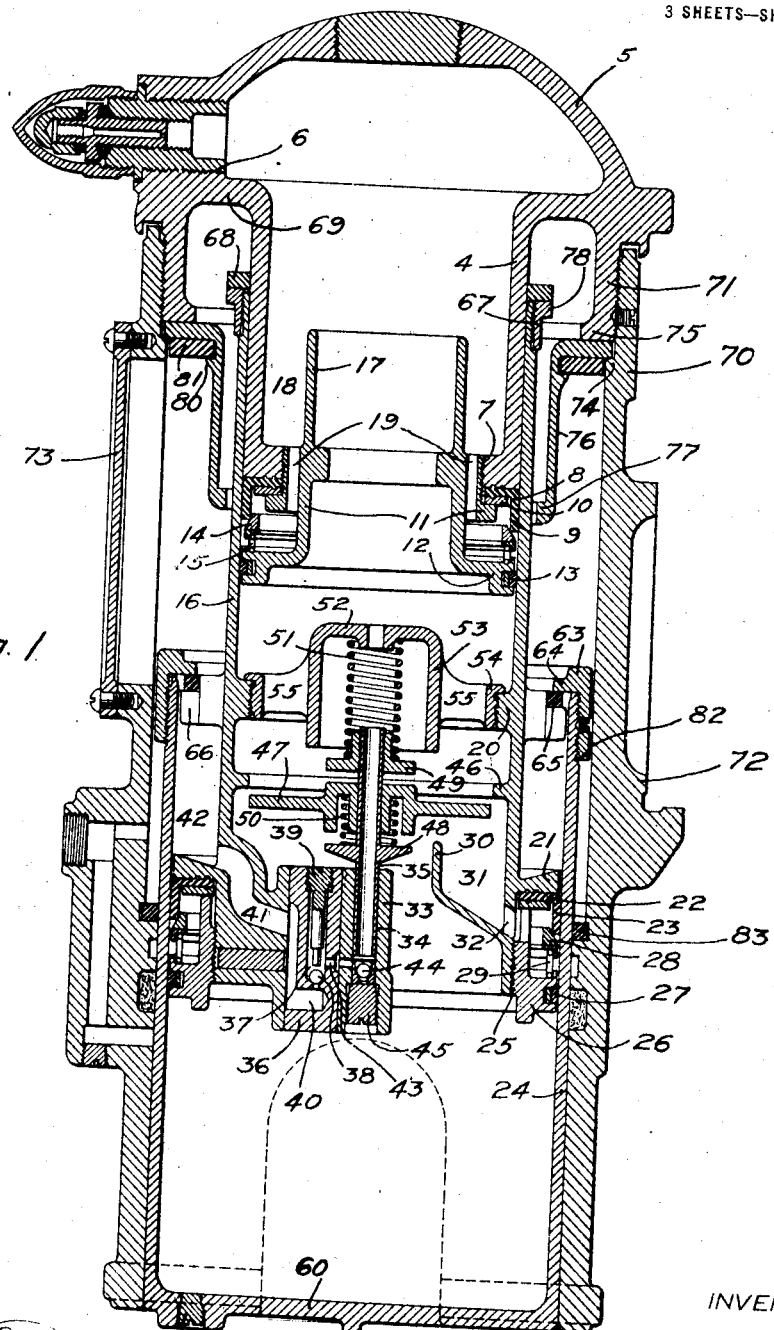

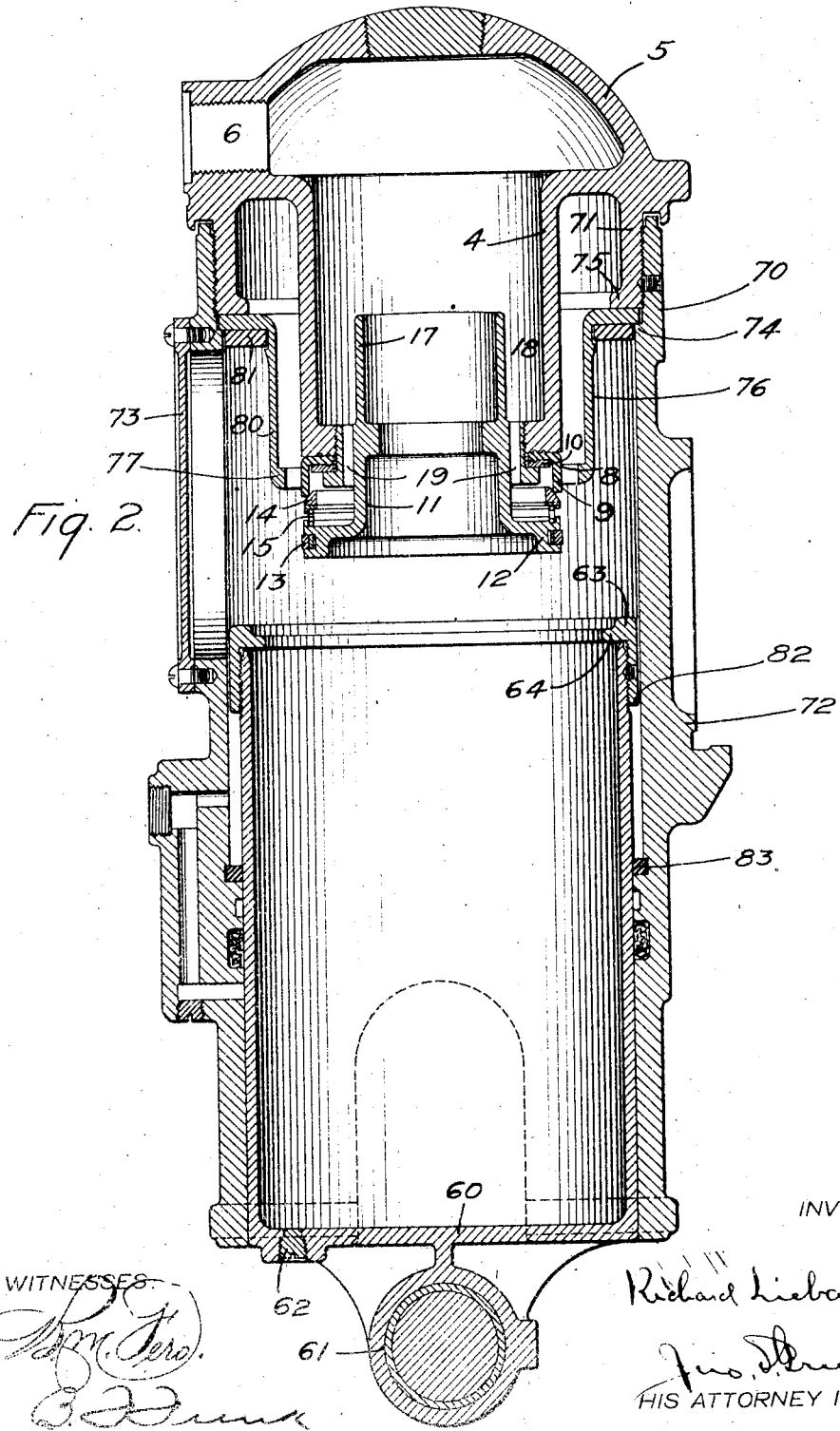

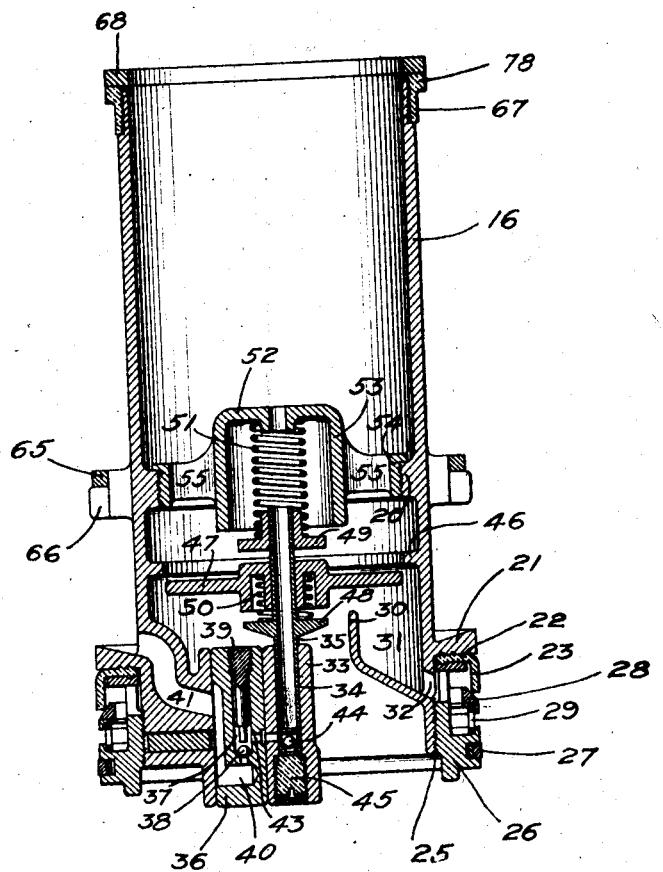

RICHARD LIEBAU, OF SWISSVALE, PENNSYLVANIA, ASSIGNOR TO THE WESTINGHOUSE AIR SPRING COMPANY, A CORPORATION OF PENNSYLVANIA.

VARIABLE-LOAD AIR-SPRING.

1,218,875.

Specification of Letters Patent. Patented Mar. 13, 1917.

Application filed May 13, 1913. Serial No. 767,312.

*To all whom it may concern:*

Be it known that I, RICHARD LIEBAU, a citizen of the United States, and a resident of Swissvale, in the county of Allegheny and State of Pennsylvania, have made a new and useful Invention in Variable-Load Air-Springs, of which the following is a specification.

This invention relates to an elastic fluid cushion device.

In the present case, the invention is embodied in a fluid cushion device adapted for use as a spring which may be used in any relation where two bodies are so associated that resilient movement therebetween is desirable, and the general object in view has been to embody the principles of resilient support by an elastic fluid, such as air or any other gas, in a commercially practical, self-contained, fluid-tight cushion device adapted to serve all the purposes and functions of a spring.

In my present invention a fluid tight joint is provided between sliding surfaces. This is attained by means of a cylindrical or cup-leather packing tightly clamped in one of the sliding members and having its free edge presented in the direction of the high pressure and yieldingly forced into engagement with the outer wall of the sliding joint by means of a rigid cone spring pressed in a direction parallel with the axis of the device. It also involves the use of a collecting space for the oil or other sealing fluid which finds its way past the leather packing, and of a pump within the device for pumping the escaped oil back to the interior or compression chamber of the device.

In motor vehicles, such as trucks and delivery wagons, when utilizing steel springs, it is necessary to make the springs stiff enough to carry the full load to which the trucks or wagons may be subjected, and when this is done, of course, the springs are practically ineffective unless the load is carried.

An object of this invention is to provide an elastic fluid cushion device which will not only be effective when the vehicle to which it is attached is loaded, but when the same is without load, and for that purpose I provide a cushion device having two effective diameters,—one to serve as an effective cushion when the vehicle is without load or when lightly loaded, and the other to serve when the vehicle is fully loaded or loaded beyond a determined point.

In the present embodiment of the invention, I form a closed chamber by means of three telescopically arranged members,—an inner member having a closed outer end, an outer member having a closed outer end, and an intermediate member bridging the space between the other two and telescopically arranged outside of the inner member and inside of the outer member, whereby a cushion chamber of two effective diameters is formed having two sliding joints, the smaller diameter serving as the cushion for the light loads, and the larger serving as the cushion for the heavy loads.

The three members are so arranged that the intermediate member floats between the two and automatically assumes the position in accordance with the load conditions.

In the present case, while there are two sliding joints to the closed chamber but one oil collecting space is employed and but one pump for returning the oil from the collecting space to the interior of the chamber.

Without any idea of limiting this invention, but for the sake of clearness, the device will hereinafter be referred to as an air spring.

In the drawings:—

Figure 1 is a longitudinal sectional view of an air spring constructed in accordance with this invention;

Fig. 2 is a view of the spring shown in Fig. 1 with the intermediate member removed; and Fig. 3 is a sectional view of the intermediate member.

Referring now to the drawings by numerals of reference:

The device consists of an inner member having a cylindrical portion 4 and a head 5 provided with a filling opening 6 adapted to be closed by means of a screw threaded plug provided with an air valve such as those commonly used for pneumatic tires. The lower end of cylindrical member 4 is internally threaded at 7 and is faced to receive a cup-leather packing 8 the outer or free edge 9 of which extends parallel to the axis of cylindrical portion 4. The cup-leather packing is secured in place by means of a washer 10 and a nut 11 threaded into the cylindrical member at 7. The nut 11 has an enlarged portion 12 provided with a groove for receiving a leather packing 13; a cone-shaped expander ring 14 bears against the outer or free edge 9 of the cup-leather packing and by means of the spring 15 which is located between expander ring 14 and the enlarged portion 12 of nut 11 yieldingly forces said outer or free edge 9 of the cup-leather packing into engagement with the inner wall of intermediate member 16 hereinafter referred to. Nut 11 is provided with an upwardly extending lip 17 which with cylindrical portion 4 of the inner member forms an oil retaining chamber 18, and this is placed in connection with the space around the cup-leather packing by means of ducts 19 drilled through the nut. The leather packing 13 bearing against the inner surface of intermediate member 16 forms a closed-in space for oil and retains the oil coming from the reservoir 18 in connection with the outer or free edge 9 of the cup-leather packing. Intermediate member 16 throughout the major portion of its length is cylindrically formed and above an inwardly extending flange 20 (which is internally screw-threaded) is machined so as to present a smooth surface to cup-leather packing 8. The lower end of intermediate member 16 is provided with an outwardly extending flange 21 the under side of which is faced to receive a cup-leather packing 22 which has its free edge 23 extending parallel to the axis of the device and which bears against the inner machined surface of an outer cylinder member 24.

The lower end of intermediate member 16 is externally threaded at 25 to receive a nut 26 which carries a leather packing 27 for closing in an oil retaining space around or in connection with the outer or free edge 23 of cup-leather packing 22. The outer or free edge 23 of cup-leather 22 is yieldingly forced into engagement with the inner surface of outer member 24 by means of a cone expander ring 28 which is yieldingly pressed against the inner edge of the cup-leather by means of a spring 29 confined in place by the nut 26.

Intermediate member 16 is provided with an inwardly extending wall 30 which forms an oil reservoir 31 for feeding through ducts 32 the space closed in by leather packing 27. A boss 33 extending inwardly from intermediate member 16 carries the pump for returning the oil or other sealing fluid which leaks past cup-leather packings 8 and 22 to the interior or cushion chamber of the spring. The boss 33 is bored out at 34 to receive a pump plunger 35 and a check valve housing 36.

The check valve housing 36 is preferably sweated into its bore in boss 33 and is provided with a valve chamber 37 within which a ball valve 38 is located. The ball is retained in an operative position by means of a retaining screw 39. The valve housing 36 is provided with an inlet passage 40 which communicates with a passage 41 cored in boss 33 and which leads from space 42 above flange 21 to passage 40 in the valve housing. An outlet 43 connects valve chamber 37 above the ball valve to the pump chamber 34. Pump plunger 35 is formed hollow from top to bottom and a ball check valve 44 is seated in the bottom of the plunger. A stop plug 45 is screwed into the bottom of bore 34 and forms a stop for the downward motion of the pump plunger, and it will be seen that the pump plunger moves down far enough to seal the inlet passage 43 to the pump.

At 46 intermediate member 16 is provided with an inwardly extending flange and loosely mounted on pump plunger 35 is a disk 47 which coöperates with said flange to form a motor for operating the pump. The disk 47 lies between two collars 48 and 49; 48 is preferably formed integrally with the pump plunger, and 49 is threaded on to the upper end of the plunger.

The disk 47 is supported out of contact with collar 48 by means of a coil spring 50. This spring will keep the disk from adhering to collar 48 on account of the viscosity of the oil or other sealing fluid, and also will maintain the disk 47 in such position as to form a normally restricted passage between the outer edge of the disk and inwardly extending flange 46. A coil spring 51 confined between collar 49 and a spring retainer 52 threaded into flange 20 tends to yieldingly hold the pump plunger toward the limit of its downward movement. Spring retainer 52 is connected from its inner portion 53 to its outer portion 54 by means of webs 55 and between these webs the liquid in the interior of the device is free to pass. The bottom 60 of outer member 24 is provided with an eye 61 adapted to be attached through suitable shackles or links and levers to the vehicle running gear or more particularly to the steel springs forming a part thereof. Bottom 60 is provided with a drain plug 62 in order that if it is necessary liquid may be drained from the interior of the spring. Screwed on to the upper end of member 24 is a retaining ring 63 provided with an inwardly extending flange 64 adapted on the extreme outer movements of the air spring to contact with a leather buffer ring 65 which rests upon the serrated outer edge of a flange 66 formed on intermediate member 16. The serrations in this flange permit the oil to pass therebetween into collecting space 42, that is, the oil which leaks past upper cup-leather packing 8.

Threaded on to the upper outer edge of intermediate member 16 is a flange retainer ring 67 and resting thereon is a leather buffer ring 68 which serves as a buffer between said flange and an inwardly extending wall 69 which joins head 5 to cylindrical portion 4.

An outer guard or cylinder 70 threaded on to a depending flange 71 of the head 5 is adapted to be rigidly attached to the vehicle chassis upon which the spring is to be used and a pad 72 is furnished for that purpose. The outer guard or cylinder 70 is provided with an inspection plate 73 which gives access to a portion of the interior of the device.

Between shoulder 74 and the lower edge 75 of depending flange 71 a retainer member 76 is clamped. This retainer member is provided with an inwardly extending flange 77 which is adapted to contact with an outwardly extending flange 78 on retainer ring 67 when the intermediate member 16 reaches the downward limit of its travel during assembling. It, however, does not so act during the operation of the device because the lower edge 82 of retainer ring 63 contacts with a leather buffer ring 83; the distance between 82 and the buffer ring 83 being less than the distance between the flange 77 and the flange 78 of the retaining ring 67.

An outwardly extending flange 80 formed on retainer member 76 holds a leather buffer ring 81 in place so that it will contact with the upper face of retaining ring 63 when the outer cylinder 24 reaches the inner limit of its travel.

Under normal operating conditions the interior of the spring is charged with a determined quantity of sealing liquid for the packings, such for example as oil, and it is also charged with compressed air, which tends to extend the spring by moving its inner element 4 and its outer element 24 away from each other, and forms the supporting medium for the chassis or body of the vehicle.

During light loads on the chassis the intermediate sleeve 16 is moved upwardly by reason of the unbalanced internal pressure acting on its lower edge and on the lower face of the nut 26 so that the buffer 66 and the cushion 65 carried by it are moved against the inwardly extending flange 64 of the outer member 24; it being understood that pressure in the annular passage 42, and exterior passages communicating therewith, is approximately atmospheric pressure materially less than the pressure within the interior chambers of the spring. Under these conditions, the sleeve 16 is in effect locked to the outer member 24 and the internal pressure exerted on its lower edge and on the lower annular face of the nut 26 has no supporting effect whatever but merely exerts a strain to the cylindrical wall of the inner member 24 and operates to lock this member and the sleeve together. The expansion and contraction of the spring in response to variations in the relative positions of the running gear and the chassis of the vehicle cause relative motion between the inner member 4 and the sleeve 16 and the unbalanced interior pressure acting on the member 4 is the only pressure operative in supporting the load. An examination of the drawings will show that this load supporting force is equal to the internal pressure multiplied by the area of a circle having a diameter equal to the internal diameter of the sleeve 16.

During heavy loads the weight transmitted by the chassis to the member 4 depresses this member to such an extent that its outwardly extending wall 69 engages the buffer ring 68 on the flange retainer ring 67, which is mounted on the sleeve 16. A further depression of the member 4 will therefore move the buffer ring 65, of the sleeve, out of engagement with the flange 64, of the outer member 24, and cause the cup packing 22 of the sleeve to move downwardly along the inner face of the member 24. As soon as the locking engagement between the sleeve 16 and the member 24 is broken, the unbalanced pressure occasioned by the internal pressure operating on the lower face of the nut 26 and the lower edge of the sleeve 16 transmits an upward thrust through the buffer 68 to the inner or chassis supporting member 4. It is therefore apparent that the effective area of the spring is increased by the area of the lower face of the annular nut plus the area of the lower edge of the sleeve; in other words the effective supporting force of the spring, under heavy loads, is equal to the internal pressure times the area of a circle having a diameter equal to the internal chamber of the sleeve 24.

During the expansions and contractions of the spring, the oil contained in it will surge first in one direction and then in the other and will operate the pump plunger 35 through the agency of the disk 47, and the sealing liquid leaking past both the packing 8 and the packing 22 will be returned to the interior of the spring from the chamber 42.

In accordance with the provisions of the patent statutes I have described the principle of operation of my invention together with the device which I now consider to represent the best embodiment thereof, but I desire to have it understood that the device shown is only illustrative and that the invention can be carried out in other ways.

Having thus described my invention what I claim is:

1. A cushioning device comprising telescopically arranged members having a sliding joint therebetween and forming an inclosed chamber of variable volumetric capacity, a floating member telescopically arranged with each of said first mentioned members, for increasing the effective load supporting area of the device when the load supported thereby is increased, and for decreasing the effective load supporting area of the device during light loads, a separate packing between said floating member and each of the first mentioned members, and a pump mounted on the floating member for returning liquid leaking past both packings to said chamber.

2. A cushioning device comprising two relatively movable telescopically arranged members inclosing a chamber of variable volumetric capacity, a floating member telescopically arranged with both of said members and adapted to move under conditions of light load with one and under heavy load conditions with the other of said first mentioned members, a separate packing between said floating member and each of said first mentioned members, and means mounted on said floating member for returning liquid leaking past both of said packings to said chamber.

3. A cushion device comprising telescopically arranged members forming a closed chamber having two effective diameters, a sliding joint for each diameter, and a pump the inlet of which connects with the low pressure side of one of said sliding joints and the outlet of which connects with the interior of said chamber.

4. A cushion device comprising telescopically arranged members forming a closed chamber of two effective diameters, a sliding joint for each diameter, a pump the inlet of which connects with the low pressure side of the sliding joint for the largest diameter and the outlet of which connects with the interior of said chamber.

5. A cushion device comprising three telescopically arranged members having two sliding joints therebetween and forming a closed chamber of two effective diameters, and a pump within said chamber having its inlet connected to the low pressure side of one of said sliding joints and its outlet connecting with the interior of said chamber.

6. A cushion device comprising three telescopically arranged cylinders forming a closed chamber having two effective diameters and two sliding joints, packing for said sliding joints and a pump within the chamber the inlet of which connects with the low pressure side of one of said packings and the outlet of which connects with the interior of said chamber, and means within said chamber for operating said pump.

7. A cushion device comprising two cupped members arranged so that their open ends face one another, and relatively sliding cylinders connecting said members and with them forming a closed chamber having two effective diameters and two sliding joints, liquid and gaseous fluids within said chamber, and means for returning the liquid passing said joints to the interior of the chamber.

8. A cushion device comprising an inner or light load cylinder, an outer or heavy load cylinder, and an intermediate cylinder telescopically arranged between said inner and outer cylinders, and with them forming a closed chamber having two effective diameters and two sliding joints, packing for said joints and a pump within said chamber the inlet of which connects with the low pressure side of one of said joints and the outlet of which connects with the interior of said chamber.

9. A cushioning device comprising telescopically arranged members having sliding joints therebetween and forming an inclosed chamber of variable volumetric capacity, and means for increasing the effective load supporting area of the device when the load supported thereby is increased and for decreasing the effective load supporting area of the device during light loads on the device, and a pump mechanism mounted on said means for returning leakage liquid to said chamber.

10. A cushioning device comprising a supported member, a load supporting member, and an intermediate sleeve coöperating therewith to form a closed chamber of variable volumetric capacity, in combination with means for reducing the effective area of the load supporting member during light loads and for increasing its effective area during heavy loads.

11. A pneumatic cushioning device comprising a supported member and a load supporting member inclosing a chamber of variable volumetric capacity, in combination with means for increasing the unbalanced effective load supporting area of the load supporting member during heavy loads and for decreasing its effective area during light loads, and a pump mechanism carried by said means for returning leakage liquid back to said chamber.

12. A cushioning device comprising a supported member, a load supporting member, and a floating sleeve extending between said members and coöperating therewith to form a closed chamber of variable volumetric capacity, said sleeve being provided with means for forcing it into locking engagement with the supported member during light loads and for engaging the supporting member during heavy loads.

13. A pneumatic cushioning device comprising a supported member, a load supporting member, and an intermediate sleeve between said members and coöperating therewith to form a pressure chamber of variable volumetric capacity, said intermediate sleeve being provided with an extending flange subjected on one side to the pressure within the chamber and on the other side to exterior pressure, and means for locking the sleeve into engagement with the supported member or with the supporting member, dependent on the relative positions of the members.

14. A cushioning device, comprising two relatively movable telescopically arranged members inclosing a chamber of variable volumetric capacity, a cylindrical member located within said telescopic members, a packing between the inner face of said cylindrical member and one of said telescopically arranged members, a packing between the outer face of said cylindrical member and the other of said telescopically arranged members, and means mounted on the cylindrical member adapted to return liquid leaking from said chamber past both said packings back to the chamber.

15. A pneumatic cushioning device, comprising a supported member, and a load supporting member inclosing a chamber of variable volumetric capacity, in combination with a cylindrical member located within said first mentioned members and so arranged that one end is subjected to the pressure within said chamber and the other end is subjected to exterior pressure, and means carried by the cylindrical member for returning liquid leaking from the chamber back to the chamber.

In testimony whereof, I have hereunto subscribed my name this 8th day of May, 1913.

RICHARD LIEBAU.

Witnesses:
C. W. McGHEE,
ANNA CLOHERTY.